Patented Apr. 21, 1953

2,636,011

UNITED STATES PATENT OFFICE 2,636,011

FISCHER-TROPSCH CATALYST PREPARATION AND REGENERATION

Alfred Clark, Bartlesville, Okla., assignor to Phillips Petroleum Company, a corporation of Delaware No Drawing. Application February 2, 1948, Serial No. 5,909

14 Claims. (Cl. 252—411)

This invention relates to catalysts generally, and more specifically it relates to the preparation of catalysts for the synthesis of hydrocarbons.

In the synthesis of hydrocarbons by the method commonly known as the Fischer-Tropsch process, carbon monoxide and hydrogen may be reacted at elevated temperatures and at atmospheric or higher pressures in the presence of a suitable catalyst to yield hydrocarbons ranging in molecular weight and constitution all the way from methane to waxy materials, with the concomitant formation of varying amounts of oxygenated material, depending on the nature of the catalyst and the reaction conditions.

The reaction is generally carried out in a manner which will yield substantial proportions of hydrocarbons boiling in the gasoline range as well as high-boiling hydrocarbons. Catalysts used in this synthesis include cobalt, iron, nickel or ruthenium, and these may be promoted with alkali metals, alkaline earth metals or their oxides, thoria, or various other known materials. The catalysts of the prior art may be utilized on inert supports such as kieselguhr or the like. Using cobalt-containing catalysts temperatures in the range of 175–225° C. may be used with a preferred temperature being about 185–190° C. Ordinary iron catalysts operate best in a narrow range close to 240° C. while sintered iron catalysts require temperatures in the neighborhood of 320° C.

The synthesis reaction is ordinarily carried out at atmospheric or medium pressures depending on the products desired and the catalysts used. A preferred range of pressures suitable for general use is from about 5–15 atmospheres, but pressures up to 150 atmospheres or even higher may be used. Flow rates are variable depending on a number of factors such as catalysts, products desired, and the nature and extent of the cooling.

An object of this invention is to provide an improved method for preparing catalysts to be used in the synthesis of hydrocarbons. It is a further object of this invention to provide an improved method of preparing hydrocarbon synthesis catalysts which will tend to reduce the formation of heavy waxy hydrocarbons and thus to decrease the tendency toward deleterious depositions upon the catalyst. It is a further object of this invention to provide a catalyst of improved characteristics for synthesizing hydrocarbons.

In the synthesis of hydrocarbons from carbon monoxide and hydrogen using fluid or finely powdered catalysts, the use of fused iron oxide as a catalyst is desirable because it is relatively inexpensive and it provides a rugged catalyst. Catalysts of this type are prepared by the reduction of $Fe_3O_4$, ferroso ferric oxide, which oxide may be obtained by the burning of iron with oxygen with the resultant formation of a molten mass of the iron oxide followed by crushing of the mass to the divided state. It was found, however, that the pure or unpromoted iron catalysts do not produce optimum results in the reactions, particularly when used in finely divided or fluidized form. Such results are manifested by a lowered efficiency and increased methane formation as well as other effects.

The promotion of reduced iron oxide catalysts with potassium oxide alone or with other oxides such as alumina as a means of improving the suitability of these catalysts for hydrocarbon synthesis is known. It has been found, however, that the proportion of potassium oxide added is critical. For example, the addition of 0.2 to 0.35 weight per cent of potassium oxide (based on total oxides used) produces a catalyst that increases the formation of normally liquid hydrocarbons. When 0.5 per cent, or more, potassium oxide is added, the resulting catalyst produces undesirably high yields of heavy hydrocarbons, such as wax. When it is desired to synthesize gasoline, the production of large amounts of wax is undesirable because the gasoline yield is proportionately decreased. Furthermore, some of the wax produced accumulates on the catalyst and lowers the catalyst activity.

The use of the desirably small proportions of promoter makes duplication of a given catalyst difficult. The promoter is usually added, e. g. as $KNO_3$, to molten iron oxide during the preparation of the catalyst. Some potassium is thus almost inevitably lost, apparently by vaporization; consequently, the incorporation of a given amount of potassium in the catalyst with precision is difficult.

I have found that the wax-forming tendency of reduced iron oxide catalysts promoted with potassium oxide is markedly reduced by treating the reduced catalyst with carbon dioxide. The wax-producing property of the potassium oxide being thus counteracted, larger proportions of potassium oxide may be used to promote gasoline synthesis than have been previously permissible. Furthermore, a given catalyst composition may be duplicated with increased precision, since the proportion of potassium lost during preparation is decreased. This result is of considerable value in commercial practice.

This invention is applicable mainly to reduced iron oxide catalysts promoted with potassium oxide. Other Fischer-Tropsch catalysts may, however, be treated in accordance with the invention.

One type of catalyst amenable to treatment in accordance with the invention is prepared by melting iron or iron oxide by contact with an oxyhydrogen flame, mixing the potassium oxide (usually added as $KNO_3$) with the molten material, cooling, grinding to 60–200 mesh size, and reducing with hydrogen at 300°–600° C.

This catalyst may be treated, in accordance with this invention, by contacting with carbon dioxide and may then be used in the synthesis of gasoline from carbon monoxide and hydrogen. Any suitable contacting method may be used in the carbon dioxide treatment. The catalyst may simply be heated in a nonflowing atmosphere of carbon dioxide, or a stream of carbon dioxide may be passed over or through the catalyst. The treatment with carbon dioxide is preferably conducted at 250°–350° C., but this temperature range is not critical, and temperatures outside this preferred range may be used. Below 250° C. undesirably long periods of treatment are required, whereas, at temperatures appreciably above 350° C., oxidation of the catalyst may proceed to an undesired extent. The preferred pressure range for the treatment is about 5 to 30 atmospheres, although pressures outside this range may be used. The contact time required is about 5–30 hours. The carbon dioxide treatment may precede the reduction with hydrogen, but preferably it is effected after the catalyst has been reduced with hydrogen.

The treatment with carbon dioxide in accordance with this invention may be applied to catalysts that have been used in the Fischer-Tropsch synthesis and subsequently treated with hydrogen to restore the activity.

The carbon dioxide treatment is also applicable to catalysts containing potassium oxide together with other known promoters, such as alumina.

Although the action of the carbon dioxide on the catalyst is not thoroughly understood, it is possible that the carbon dioxide oxidizes the catalyst to a limited degree and thus decreases the tendency to produce wax.

It is known to contact hydrocarbon synthesis catalysts with carbon monoxide before using the catalysts for the synthesis. This contacting, which is known as "precarbiding," reduces the tendency of fresh catalyst to promote the formation of undesired by-products, such as methane and wax, when the catalyst is first introduced into the synthesis reactor. The precarbiding may be conducted, for example, by contacting a reduced iron oxide catalyst, such as those previously described, with the synthesis gas ($2H_2+CO$) at about 250° C., raising the temperature gradually to about 285° C. over a period of about 9 hours, and continuing the contacting at about 285° C. for about 1 hour.

The carbon dioxide treatment in accordance with this invention is especially applicable to a precarbided catalyst. Thus, in a continuous system, a finely divided, freshly prepared, reduced iron oxide catalyst may flow to a precarbiding step, in which it is precarbided as previously described, then to a carbon dioxide contacting step, also previously described, and then to a hydrocarbon synthesis step for conversion of carbon monoxide and hydrogen to hydrocarbons. Also, used catalyst may be continuously withdrawn from the synthesis reactor, contacted with hydrogen at the temperature of the synthesis or at higher temperatures if desired, contacted with carbon dioxide in accordance with this invention, and returned continuously to the synthesis reactor. At least part of the carbon dioxide may be obtained from the normally gaseous fraction of the synthesis effluent by conventional methods such as refrigeration, adsorption, solvent extraction, etc. Also, fresh catalyst and the used catalyst withdrawn from the synthesis reactor may be simultaneously contacted with carbon dioxide in the same container.

*Example*

Synthesis gas comprising hydrogen and carbon monoxide in a mol ratio of 2:1 was passed upward through a reduced iron oxide catalyst at 295° C. and 250 p. s. i. and a space velocity of 2500 volumes of gas per volume of catalyst per hour. The particle size of the catalyst was 60–200 mesh. The catalyst was previously reduced with hydrogen at 500° C. for 48 hours. Before reduction, the catalyst contained 0.5 weight per cent $K_2O$ and minor proportions of calcium oxide and alumina as promoters. In this synthesis, 95–98 per cent of the carbon monoxide was converted, 65–70 per cent of this amount being converted to pentane and heavier hydrocarbons. The pentane-and-heavier fraction of the product contained a large proportion of wax, and, after 15 hours operation, the synthesis had to be discontinued because of the large amount of wax accumulated on the catalyst.

The catalyst was revivified by treating with hydrogen at about 500° C. It was then treated with carbon dioxide at 280° C. for 16 hours. The synthesis was then resumed under the conditions previously described. The carbon monoxide conversion was 95 per cent, and the catalyst activity was not impaired by wax formation. Of the carbon monoxide converted, 42 per cent was converted to pentane and heavier hydrocarbons. The pentane-and-heavier fraction of the product was much lighter than that originally obtained. After 48 hours of operation, the pentane-and-heavier yield had risen to 60–65 per cent of the carbon monoxide converted, and the product contained relatively small amounts of heavy hydrocarbons. Furthermore, no necessity for high temperature revivification of the catalyst with hydrogen was indicated at the end of the 48 hour period.

The above example is merely a preferred method of operation, but the invention should be limited only by the following claims.

I claim:

1. The method of improving a reduced iron oxide catalyst, for the synthesis of hydrocarbons from carbon monoxide and hydrogen, promoted with a minor proportion of potassium oxide which comprises contacting said catalyst with a stream consisting essentially of gaseous carbon dioxide for at least 5 hours at a temperature in the range 250°–350° C. whereby the formation of deleterious waxy deposits upon the surfaces of said catalyst during the synthesis is inhibited.

2. The method of improving a reduced iron oxide catalyst, for the synthesis of hydrocarbons from carbon monoxide and hydrogen, promoted with a minor proportion of potassium oxide and other metallic oxides which comprises contacting said catalyst with a stream consisting essentially of gaseous carbon dioxide for 5–30 hours at a temperature in the range 250°–350° C. and at a pressure in the range 5–30 atmospheres whereby the formation of deleterious waxy deposits upon the surfaces of said catalyst during the synthesis is inhibited.

3. The method of preparing a finely divided powdered catalyst for the catalytic synthesis of hydrocarbons from carbon monoxide and hydrogen which comprises melting a mass of iron oxide, adding a minor proportion of potassium nitrate to the molten iron oxide, cooling the thus-formed mixture, grinding said mixture to form particles of a 60–200 mesh size, contacting the ground iron oxide particles with a stream of hydrogen at 300–600° C. to effect reduction thereof to form metallic iron and contacting the hydrogen-treated iron catalyst particles with a stream consisting essentially of gaseous carbon dioxide at 250–350° C. and 5–30 atmospheres pressure for 5–30 hours.

4. The method of regenerating a finely divided, reduced iron oxide catalyst, promoted with a minor proportion of potassium oxide, which has been used to catalytically synthesize hydrocarbons from carbon monoxide and hydrogen which comprises contacting said used catalyst with a stream of hydrogen until carbonaceous deposits have been removed from said catalyst and contacting said hydrogen-treated catalyst with a stream consisting essentially of carbon dioxide for 5–30 hours at a temperature in the range 250°–350° C. prior to use in the synthesis whereby the formation of deleterious waxy deposits upon the surfaces of said catalyst is inhibited.

5. The method of regenerating a finely divided reduced iron oxide catalyst promoted with approximately 0.5 weight per cent potassium oxide and minor proportions of calcium oxide and aluminum oxide, which has been used to catalytically synthesize hydrocarbons from carbon monoxide and hydrogen, which comprises contacting said used catalyst with a stream of hydrogen at about 500° C. to remove carbonaceous deposits therefrom and contacting said hydrogen-treated catalyst with a stream consisting essentially of carbon dioxide at about 280° C. for approximately 16 hours.

6. The method of decreasing the wax-forming tendencies of an iron catalyst promoted with a minor proportion of potassium oxide for the synthesis of hydrocarbons from carbon monoxide and hydrogen which comprises contacting said catalyst with a stream consisting essentially of gaseous carbon dioxide for at least 5 hours at a pressure in the range 5–30 atmospheres prior to use in the synthesis reaction.

7. The method of decreasing the wax-forming tendencies of a reduced iron oxide catalyst promoted with a minor proportion of potassium oxide and other metallic oxides for the synthesis of hydrocarbons from carbon monoxide and hydrogen which comprises contacting said catalyst with a stream consisting essentially of gaseous carbon dioxide for 5–30 hours prior to use in the synthesis reaction.

8. The method of improving a reduced iron oxide catalyst, for the synthesis of hydrocarbons from carbon monoxide and hydrogen, promoted with a minor proportion of potassium oxide and other metallic oxides which comprises contacting said catalyst with a gas containing a substantial proportion of carbon monoxide at an elevated temperature and for a period of time sufficient to inhibit the formation of undesirable hydrocarbons during the synthesis reaction and contacting the thus-treated catalyst with a stream consisting essentially of gaseous carbon dioxide at a temperature in the range 250°–350° C. and at a pressure in the range 5–30 atmospheres for at least five hours so as to inhibit the formation of deleterious waxy deposits upon the surfaces of said catalyst during the synthesis.

9. A method according to claim 8 wherein the gas used for the carbon monoxide contacting step is hydrocarbon synthesis gas comprising carbon monoxide and hydrogen.

10. A method according to claim 9 wherein the catalyst is contacted with hydrocarbon synthesis gas at a temperature of approximately 250° C., the temperature is gradually increased to approximately 285° C. during a time interval of about nine hours and this temperature is maintained substantially constant for about one hour.

11. A catalyst for the synthesis of hydrocarbons from carbon monoxide and hydrogen which comprises a reduced iron oxide which has been promoted with a minor proportion of potassium oxide and which has been contacted with a gaseous stream consisting essentially of carbon dioxide for at least 5 hours at a temperature in the range 250°–350° C. and at a pressure in the range 5–30 atmospheres.

12. A catalyst for the synthesis of hydrocarbons from carbon monoxide and hydrogen which comprises a reduced iron oxide which has been promoted with a minor proportion of potassium oxide and other metallic oxides and which has been contacted with a gaseous stream consisting essentially of carbon dioxide for 5–30 hours at a temperature in the range 250°–350° C.

13. A catalyst according to claim 12 wherein the proportion of potassium oxide is approximately 0.5 weight per cent.

14. The method of improving a reduced iron oxide catalyst, for the synthesis of hydrocarbons from carbon monoxide and hydrogen, promoted with a minor proportion of potassium oxide which comprises contacting said catalyst with a stream consisting essentially of gaseous carbon dioxide at a temperature in the range 250°–350° C. at 5–30 atmospheres pressure for 5–30 hours whereby the formation of deleterious waxy deposits upon the surfaces of said catalyst during the synthesis is inhibited.

ALFRED CLARK.

References Cited in the file of this patent

UNITED STATES PATENTS

| Number | Name | Date |
|---|---|---|
| 1,313,314 | Metzger | Aug. 19, 1919 |
| 1,447,689 | Richardson | Mar. 6, 1923 |
| 1,489,497 | Larson | Apr. 8, 1924 |
| 1,848,723 | Jaeger | Mar. 8, 1932 |
| 2,211,022 | Michael | Aug. 13, 1940 |
| 2,347,682 | Gunness | May 2, 1944 |
| 2,360,787 | Murphree et al. | Oct. 17, 1944 |
| 2,363,739 | Meisenheimer et al. | Nov. 28, 1944 |
| 2,369,956 | Feisst et al. | Feb. 20, 1945 |
| 2,437,051 | Sensel et al. | Mar. 2, 1948 |
| 2,461,570 | Roberts | Feb. 15, 1949 |
| 2,465,462 | Layng | Mar. 29, 1949 |
| 2,527,846 | Phinney et al. | Oct. 31, 1950 |
| 2,542,422 | McGrath | Feb. 20, 1951 |

OTHER REFERENCES

Aldrich, National Petroleum News, November 7, 1945, vol. 37, No. 45, pp. R-922 to R-924.